United States Patent [19]

Johnson

[11] Patent Number: 4,465,141

[45] Date of Patent: Aug. 14, 1984

[54] FIRE SPRINKLER APPARATUS

[75] Inventor: Wilfred V. Johnson, Oxford, Mass.

[73] Assignee: U.S. Fire Control Corporation, Rochdale, Mass.

[21] Appl. No.: 310,897

[22] Filed: Oct. 13, 1981

[51] Int. Cl.³ .............................................. A62C 37/08
[52] U.S. Cl. ......................................... 169/37; 169/19
[58] Field of Search .................... 169/19, 37, 54, 56, 169/57, 38, 39, 40, 41, 42; 239/75

[56] References Cited

U.S. PATENT DOCUMENTS

| | | | |
|---|---|---|---|
| 278,217 | 5/1883 | Brown | 169/40 |
| 3,001,586 | 9/1961 | Kyle | 169/56 |
| 3,924,687 | 12/1975 | Groos | 169/19 |
| 4,015,665 | 4/1977 | Simons et al. | 169/42 X |

*Primary Examiner*—Joseph J. Rolla
*Assistant Examiner*—Charles C. Compton
*Attorney, Agent, or Firm*—John E. Toupal; Harold G. Jarcho

[57] ABSTRACT

A fire sprinkler including a valve retained by a tubular body that defines an inlet for connection to a supply of pressurized fire extinguishing fluid and an outlet for placement in a fire protected zone. The valve is movable from a closed position to an open position by a primary force produced by the pressurized fluid at the inlet. In the closed position, the valve provides a fluid tight seal between the inlet and the outlet and in the open position allows fluid flow therebetween. Retained by the valve and movable therewith is a locking mechanism reciprocably movable between an engaged position and a disengaged position. The locking mechanism is adapted in the engaged position to transfer between the valve and the tubular body a substantial first component of the primary force and to thereby prevent relative movement therebetween and is adapted in the disengaged position to substantially eliminate the first component of force and thereby allow relative movement therebetween. A latching mechanism is automatically movable from a latched position to a released position in response to a predetermined condition. In the latched position the latching mechanism is adapted to retain the locking mechanism in the engaged position and to receive therefrom only a substantially reduced component of the primary force and is adapted in the released position to permit movement of the locking mechanism into the disengaged position.

29 Claims, 6 Drawing Figures

FIRE SPRINKLER APPARATUS

BACKGROUND OF THE INVENTION

This invention relates generally to fire extinguishing sprinkler heads and, more particularly, to an automatically extendable sprinkler head that can be mounted substantially flush with the ceiling of a fire protected enclosure.

Sprinkler systems are used extensively to provide automatic fire protection for residential, commercial and public buildings. A major objection to sprinkler systems stems from the unsightly appearance of the sprinkler heads they employ. The sprinkler heads generally include rather unattractive, temperature responsive structures that extend a substantial distance below the ceilings of eto sprinkler systems stems from the unsightly appearance of the sprinkler heads they employ. The sprinkler heads generally include rather unattractive, temperature responsive structures that extend a substantial distance below the ceilings of eto sprinkler systems stems from the unsightly appearance of the sprinkler heads they employ. The sprinkler heads generally include rather unattractive, temperature responsive structures that extend a substantial distance below the ceilings of enclosures in which they are installed. In addition to presenting a generally unaesthetic appearance, projecting sprinkler heads create shadows that are undesirable in many types of structures.

In the interest of improving the appearance of sprinkler systems, various types of so-called recessed sprinkler heads have been disclosed. Such heads generally include a valve and deflector assembly that is movably mounted within a housing adapted for flush mounting in a ceiling. In response to elevated temperature, a fusible remaining element melts to release the valve and deflector assembly which is moved by water pressure into operational position below the recessed housing. In one type of flush mounted sprinkler head, the recessed valve and deflector assembly is retained in position only by a fusible alloy. Examples of such a sprinkler head are disclosed in U.S. Pat. Nos. 3,067,823 and 3,198,258. Because the full force produced by the system's water pressure is restrained by the fusible alloy, sprinkler heads of this type do not provide the quick response and reliability that is required for a fire protection system. Other prior recessed sprinkler heads employ various types of lever arrangements to reduce the force that is restrained by the fusible alloy. Heads of that type are disclosed in U.S. Pat. Nos. 2,211,399; 3,459,266; and 3,714,989. Although improving response and reliability, the lever assemblies are bulky, unattractive and costly. U.S. Pat. No. 3,080,000 discloses another recessed sprinkler head utilizing a modified assembly for reducing the force restrained by the fusible alloy. The sprinkler head disclosed in that patent employs bowed struts that are connected mechanically in parallel with the fusible alloy. As with the above-described lever assemblies, the bowed strut assembly is bulky and unattractive and adds substantially to the manufacturing costs of the sprinkler head.

The object of this invention, therefore, is to provide a fire sprinkler head that can be mounted substantially flush with the ceiling of a protected enclosure and which will quickly, automatically and reliably move into operational position below the ceiling in response to a predetermined rise in ambient temperature.

SUMMARY OF THE INVENTION

The invention is a fire sprinkler including a valve retained by a tubular body that defines an inlet for connection to a supply of pressurized fire extinguishing fluid and an outlet for placemennt in a fire protected zone. The valve is movable from a closed portion to an open position by a primary force produced by the pressurized fluid at the inlet. In the closed position, the valve provides a fluid tight seal between the inlet and the outlet and in the open position allows fluid flow therebetween. Retained by the valve and movable therewith is a locking mechanism reciprocably movable between an engaged position and a disengaged position. The locking mechanism is adapted in the engaged position to transfer between the valve and the tubular body a substantial first component of the primary force and to thereby prevent relative movement therebetween and is adapted in the disengaged position to substantially eliminate the first component of force and thereby allow relative movement therebetween. A latching mechanism is automatically movable from a latched position to a released position in response to a predetermined condition. In the latched position the latching mechanism is adapted to retain the locking mechanism in the engaged position and to receive therefrom only a substantially reduced component of the primary force and is adapted in the release position to permit movement of the locking mechanism into the disengaged position. The use of a locking mechanism that is both carried by the movable valve and functions to selectively distribute the applied primary force between the body and the latching mechanism provides a compact, recessable fire sprinkler head that will automatically, reliably and quickly move into operational position in response to a detected condition.

In a preferred embodiment of the invention, the latching mechanism includes a retainer held by a fusible alloy in contact with the locking mechanism so as to prevent movement thereof into its disengaged position and released to allow such movement by melting of the fusible alloy. The use of a latching mechanism including a retainer and fusible alloy provides for reliable activation of a sprinkler head at a predetermined excessive ambient temperature.

According to one feature of the invention, the valve comprises a piston mounted for reciprocating movement between the closed and open positions along an axis in the tubular body, the primary force is directed along the axis, each of the first and reduced components of the primary force include force components directed transverse to the axis, and a movement of the locking mechanism between engaged and disengaged positions is in a direction transverse to the axis. This feature provides a compact arrangement that is ideally suited for recessed mounting substantially flush with a ceiling of an enclosure.

According to another feature of the invention, the locking mechanism comprises a plurality of locking balls that in the engaged position are retained both by openings in a side wall of the piston and by an annular groove in the tubular body to thereby prevent relative movement therebetween. The movable locking balls and retaining groove establish with reliable and inexpensive components the desired valve locking function.

According to yet another feature of the invention, the piston defines a central cavity communicating with the locking ball receiving openings, the latching mechanism includes a retainer disposed within the central cavity and maintained in engagement with the locking balls by the fusible element, and the device further includes an adjustment element adjustably retained between the piston and the fusible element and adjustable to establish a desired contact force between the retainer and the locking balls. This feature provides a simple and inexpensive arrangement for establishing a desired retaining force on the latching mechanism during initial assembly of the sprinkler head.

In one embodiment of the invention the retainer comprises a latching ball retained within the piston cavity and axially movable therein into the released position in response to melting of the fusible element. In another embodiment of the invention, the retainer comprises a stamped retainer element also axially movable in the piston's central cavity in response to melting of the fusible element. The latching ball facilitates accurate distribution of the applied primary force while the stamped retainer element offers the advantage of inexpensive stamped parts.

Other features of the invention are a deflector supported by a lower portion of the piston for movement therewith, a guide element mounted between the piston and the inlet and adapted for movement therewith along the axis of the tubular body, an elongated stem centrally located in the tubular body and connected between the piston and the guide element, and a stop means formed on the tubular body and positioned to limit travel of the guide element toward the outlet so as to establish an open position wherein the piston lies outside the tubular body. The travel limited guide establishes in a simple manner a desired activated position for the deflector below the outlet, and the centrally located stem minimizes interference with fluid flow therebetween.

DESCRIPTION OF THE DRAWINGS

These and other objects and features of the invention will become more apparent upon a perusal of the following description taken in conjunction with the accompanying drawings wherein.

DESCRIPTION OF EMBODIMENT I

Figure 1:
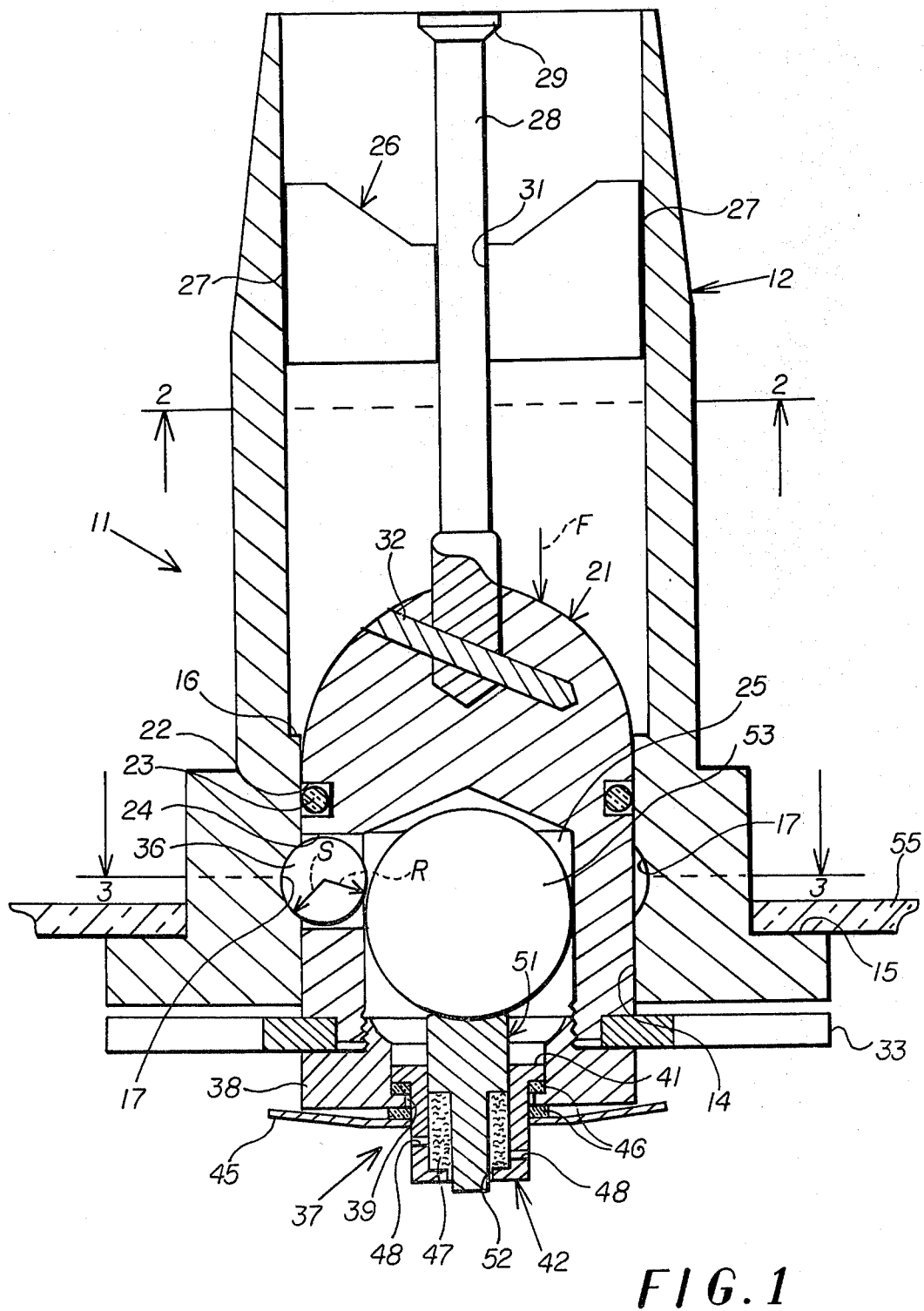
FIG. 1 is a schematic cross-sectional view of a fire sparkler head assembly according to the invention.
Figure 2:
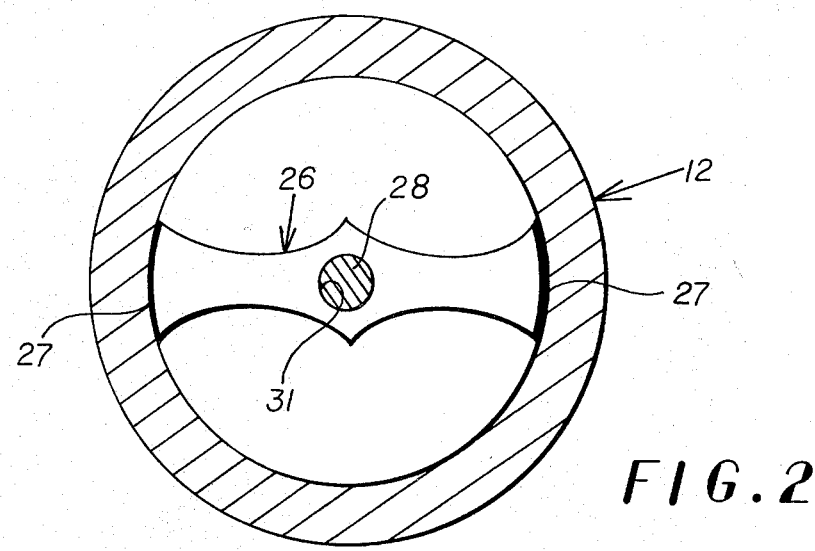
FIG. 2 is a schematic cross-sectional view taken along lines 2—2 of FIG. 1.
Figure 3:
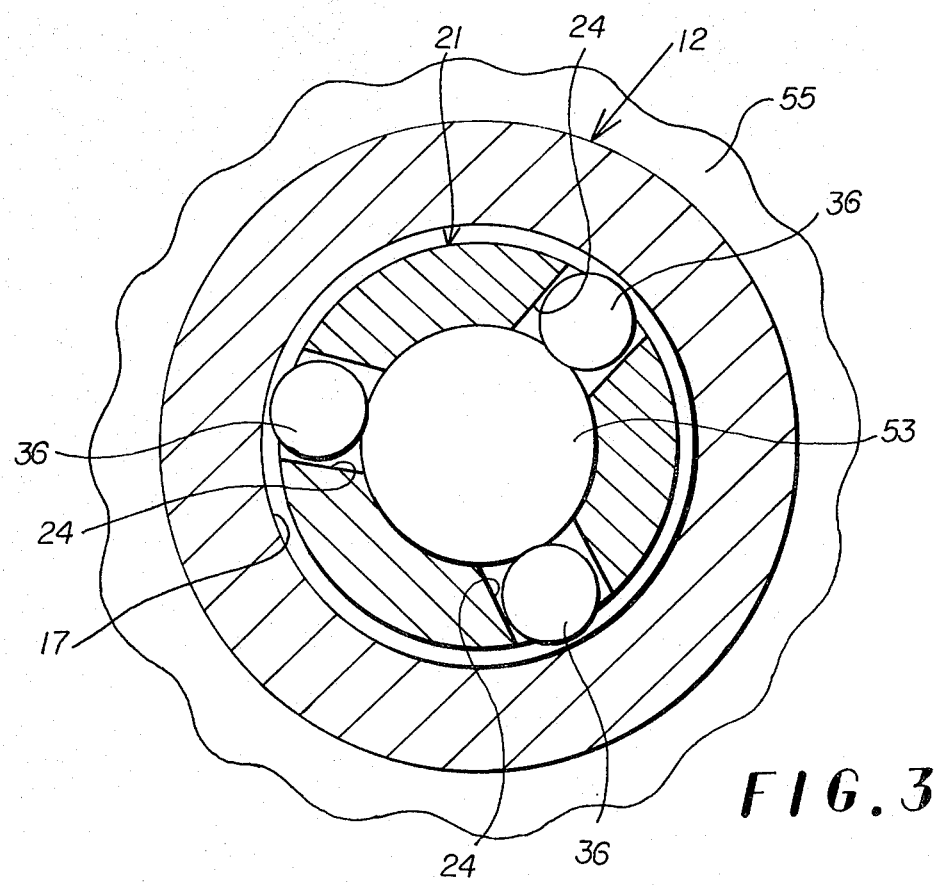
FIG. 3 is a schematic cross-sectional view taken along lines 3—3 of FIG. 1.

Illustrated in FIGS. 1-3 is a fire sprinkler head 11 including a tubular body 12 that defines an inlet 13 and an outlet 14. Formed externally on the outlet end of the tubular body 12 is an annular shoulder 15 while an internal counterbore establishes an inner annular shoulder 16. Also formed in the inner wall of the tubular body 12 between the inner shoulder 16 and the outlet 14 is an annular groove 17.

Figure 4:
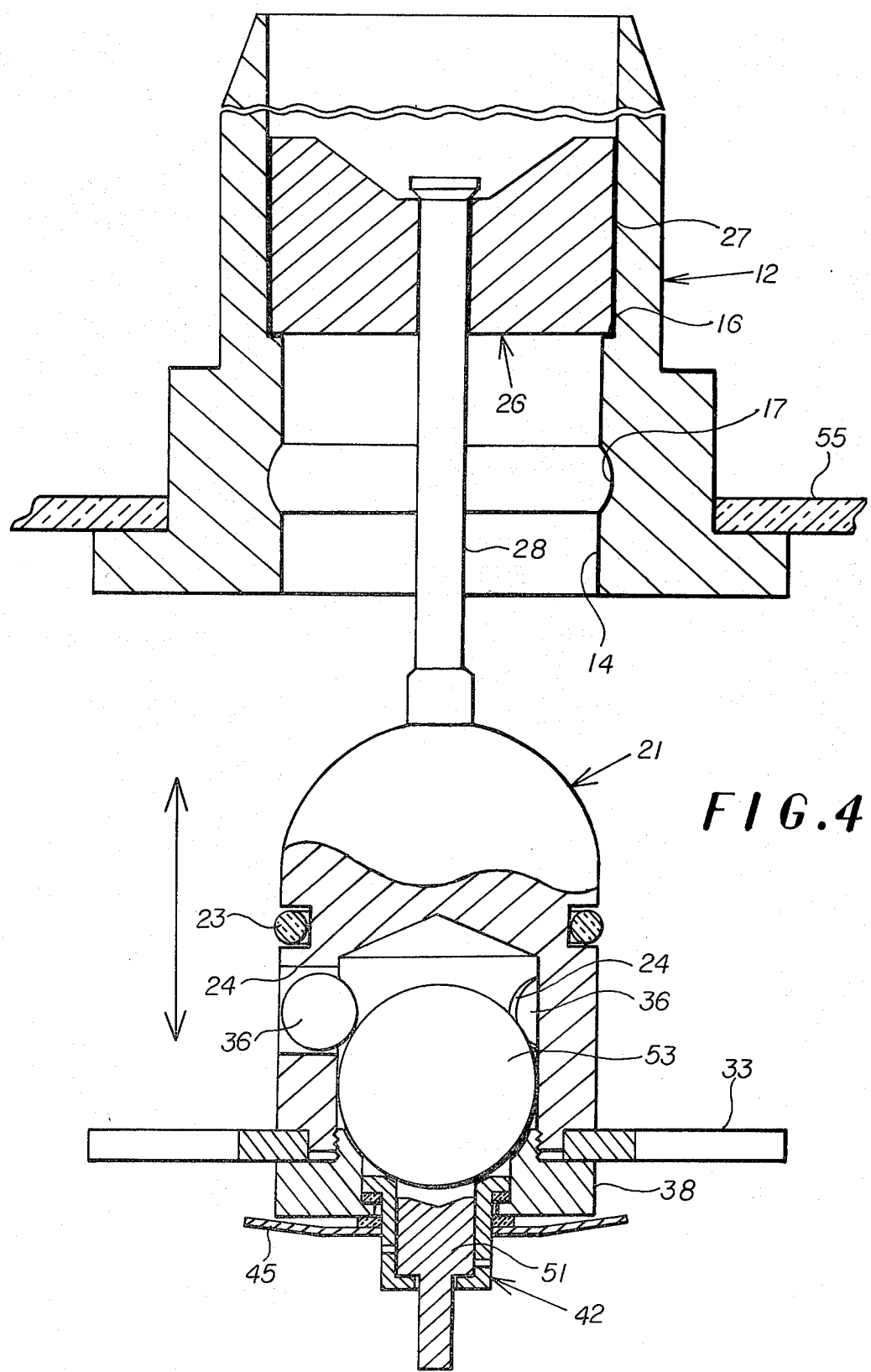
FIG. 4 is a schematic cross-sectional view showing the head of FIG. 1 in an activated position.

Retained within the tubular body 12 and closing the outlet 14 is a piston valve 21. An annular groove 22 in the outer surface of the piston 21 accommodates an O-ring 23 that provides a fluid tight seal between the inlet 13 and the outlet 14. Also formed in the piston 21 are a plurality of circumferentially distributed openings 24 that communicate with a central cavity 25. Also retained within the tubular body 12 between the piston 21 and the inlet 13 is a web member 26. Peripheral guide portions 27 on the web member 26 are arranged for sliding movement along the inner wall of the tubular body 12. Aligned with the central axis of the tubular body 12 and connecting the piston 21 and the guide web 26 is an elongated stem 28 having on its upper end an enlarged head portion 29. The stem 28 is slidably received by a central opening 31 in the guide web 26 and is attached to the piston 21 by a dowel 32. Attached to the lower end of the piston 21 and extending radially therefrom is a deflector member 33. As shown in FIGS. 1 and 4, the deflector member 33 has an outer periphery that is displaced outwardly from the latching balls 36.

As shown in FIGS. 1 and 3, each of the openings 24 retains a locking ball 36 that projects into the groove 17. The locking balls 36 are of slightly smaller diameter than the groove 17 so as to be tangentially engaged therewith. Retaining the locking balls 36 within the openings 24 is a latching retainer assembly 37 that is secured to the lower end of the piston 37. A collar 38 threadedly engages the central cavity 25 and has an inner shoulder 39 that supports an annular lip 41 of a cup-shaped fuse holder 42. Secured to and extending outwardly from the holder 42 is an annular dish-shaped heat collector element 45. Separating the shoulder 39 from both the heat collector 45 and the lip 41 are annular thermal insulators 46. A fusible alloy 47 fills the holder 42 and upon changing into a fluid state at its melting temperature flows therefrom through openings 48. Supported by the alloy 47 is the enlarged upper portion of a retainer pin 51 having a lower portion of smaller diameter that extends through a central opening 52 in the fuse holder 42. A retainer ball 53 within the central cavity 25 is engaged between the upper portion of the retainer pin and each of the locking balls 36.

During assembly of the sprinkler head 11, the piston 21 is positioned within the tubular body 12 in a closed position as shown in FIG. 1 with the O-ring 23 providing a fluid tight seal between the inlet 13 and the outlet 14. The locking balls 36 are then positioned in the openings 24, the retainer ball 53 is positioned in the central cavity 25 and the collar 38 is rotated into the threaded cavity 25 until a desired force is established through the retainer ball 53 between the locking balls 36 and the retainer pin 51. With the latching assembly 37 thereby in the latched position shown in FIG. 1, the locking balls are held in an engaged position partially within both the openings 24 and the groove 17 to thereby engage the tubular housing 12 and the piston 21 and prevent relative movement therebetween.

After assembly, the individual sprinkler heads 11 are installed in sprinkler systems to provide fire protection for a protection enclosure. The tubular housing 12 is inserted through a fitted opening in a ceiling 55 into the recessed position shown. With the shoulder 15 of the housing 12 engaging the ceiling 55, only the deflector 33 and the lower portion of the latching assembly 37 project below the ceiling 55 to establish a substantially flush mounting. After such installation, the inlet 13 is connected for fluid communication with a supply of pressurized fire extinguishing fluid such as a water main.

With fluid pressure at the inlet 13, a primary force F is applied axially to the piston 21 as diagrammatically illustrated in FIG. 1. That primary force is distributed by the locking balls 36 into a substantial first component S that is applied to the surface of the groove 17 in the tubular body 12 and a reduced component R that is applied to the retainer ball 53 of the latching assembly 37. Thus, the fusible alloy 47 does not restrain the full primary force F available for moving the piston 21. Preferably, the major component of the primary force F is applied as the component S to the tubular body 12 and only a substantially reduced component R is applied to the latching assembly 37. The relative magnitudes of the components S and R are determined, respectively, by the orientation of the force vector S between the locking ball 36 and the groove 17 and the force vector R directed between the centers of the locking ball 36 and the retainer ball 53. By providing an arrangement wherein the force vector R is more nearly horizontal than the force vector S, the magnitude of force applied to the fusible alloy 47 is less than that restrained by the tubular body 12.

OPERATION OF EMBODIMENT I

After installation in a fire sprinkler system, the sprinkler head 11 under normal conditions remains in the inactive position shown in FIGS. 1–3. However, upon the occurrence of conditions that establish an excessive ambient temperature within the protected zone occupied by the unit 11, the fusible alloy 47 melts and escapes through the openings 48 in the fuse holder 42. This causes release of the latching assembly 37 wherein the retainer pin 51 and the retainer ball 53 move axially downwardly into the released positions shown in FIG. 4. Movement of the retainer ball 53 into its released position allows the locking balls 36 to move transversely out of the groove 17 into the disengaged positions shown in FIG. 4. Having been disengaged from the groove 17 in the tubular body 12, the locking balls 36 no longer apply the force component S again the tubular body 12 and the full primary force F moves the piston axially downwardly into the open position shown in FIG. 4.

The extent to which the piston 21 moves out of the tubular body 12 and below the ceiling 55 is determined by the guide web 26. As the piston moves downwardly, the head portion 29 of the stem 28 engages the web 26 producing downward movement thereof until the guide portions 27 engage the internal shoulder 16 on the tubular body 12 thereby preventing further movement of the piston 21. With the piston valve in the open, operative position shown in FIG. 4, extinguishing fluid flows between the inlet 13 and the outlet 14 and is deflected by the deflector 33 into the fire protected zone. Because of the outward projection of the deflector's outer periphery, the locking mechanism including the balls 36 does not interfere with the deflection pattern produced. After extinguishment of the fire, the head 11 is easily returned to its inactive, recessed position by simply removing the latching assembly 37 and replacing the fuse holder 42 with a replacement holder filled with a fusible alloy 47.

DESCRIPTION OF EMBODIMENT II

Figure 5:
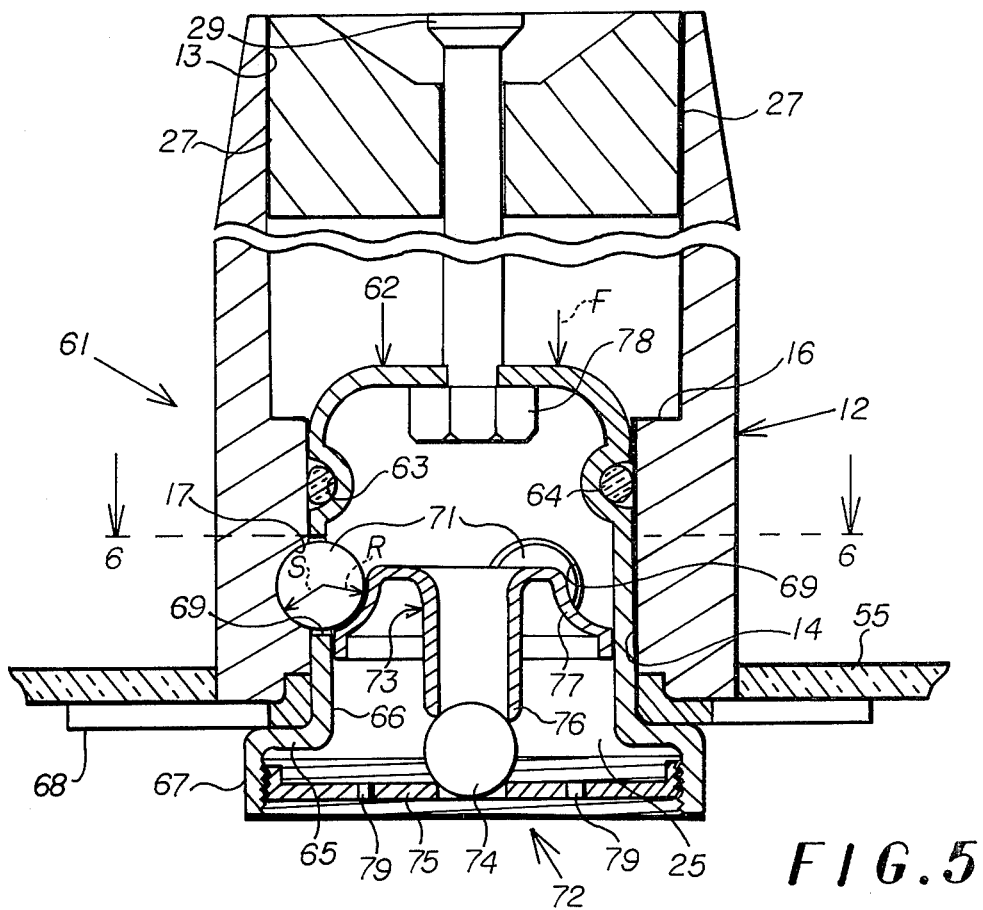
FIG. 5 is a schematic cross-sectional view of a modified sprinkler head according to the invention.
Figure 6:
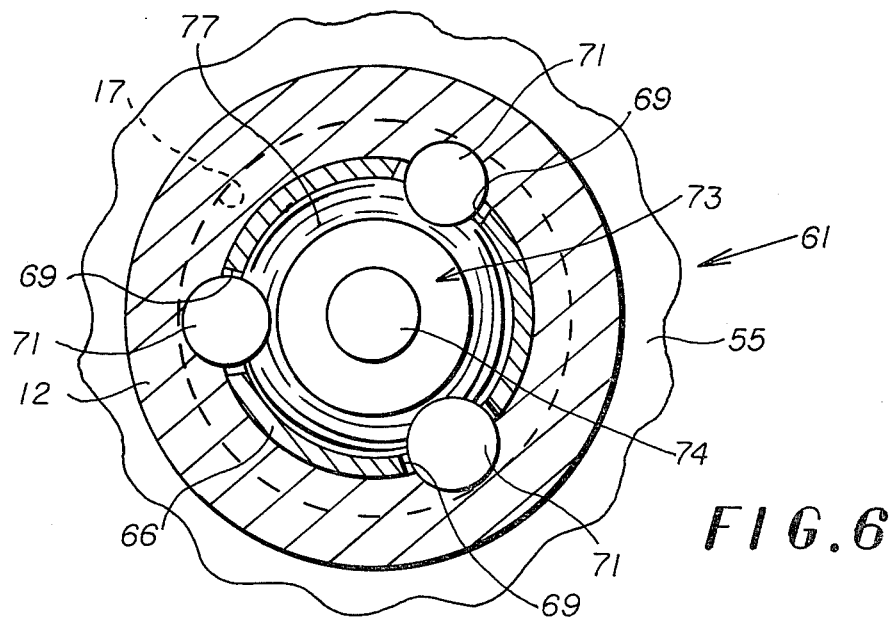
FIG. 6 is a schematic cross-sectional view taken along lines 6—6 of FIG. 5.

Referring now to FIGS. 5 and 6, there is shown another sprinkler head embodiment 61 of the invention. Certain components of the head embodiment 61 are identical to those of the head embodiment 11 shown in FIGS. 1–4 and have been given identical reference numerals. Mounted for axial movement within a tubular body 12 is a cup-shaped valve piston 62. An annular groove 63 formed in the outer surface of the piston 62 accommodates an O-ring 64 that creates a fluid tight seal between an inlet 13 and an outlet 14 of the tubular body 12. Connected by a shoulder portion 65 to a main body portion 66 of the piston 62 is a bottom rim portion 67. An annular deflector member 68 is supported by the shoulder portion 65 and is secured thereto by, for example, solder. Formed in the main body portion 66 between the groove 63 and the shoulder 65 are a plurality of circumferentially distributed openings 69 that enter into a central cavity 25. A locking ball 71 is located in each of the openings 69 and projects into an annular groove 17 in the inner wall of the tubular body 12. Retaining the locking balls 71 in the engaged positions illustrated is a latching retainer assembly 72 that includes a retainer member 73, a fusible alloy ball 74 and an adjustment member 75. The retainer member 73 comprises a hollow cylindrical center portion 76 and an outwardly extending, circularly concave upper portion 77 that engages the locking balls 71. In the latched position illustrated in FIGS. 5 and 6, the upper retainer portion 77 engages the locking balls 71 to prevent movement thereof in directions transverse to the axis of the tubular body 12. The fusible alloy ball 74 is retained between the bottom of the central portion 76 and the adjustment member 75 that is threadedly engaged with the rim portion 67 of the piston 62. Secured by a nut 78 to the upper end of the piston 62 is one end of a stem 28 the opposite end of which extends through a central opening in a guide web 26.

During assembly of the sprinkler head 61, the piston 62 is inserted through the outlet 14 of the tubular body 12 and the guide web 26 is inserted through the inlet 13 thereof and secured to the piston 62 with the nut 78. The locking balls 71 are then positioned in their engaged positions within the openings 69 and the groove 17. Subsequent insertion of the retainer assembly 72 latches the balls 71 in their engaged position and a desired latching force between the assembly 72 and the locking balls is obtained by appropriate longitudinal adjustment of the adjustment member 75. This procedure is accomplished with a suitable wrench that is received by openings 79 in the adjustment member 75. After installation into a celling 55, the inlet 13 is connected for fluid communication with a suitable source of pressurized extinguishing fluid.

In the event of excessive ambient temperatures accompanying a fire, the fusible alloy 74 melts allowing the retainer element 73 to move downwardly axially into a released position. This permits the locking balls to move transversely into disengaged positions out of the groove 17. The primary force F produced by the pressurized fluid then forces the piston 62 out of the tubular body 12 into an open position that allows discharge of extinguishing fluid from the outlet 14 onto the deflector 68. As with the embodiment 11, the open position of the piston 62 is established by engagement of the guide portions 27 with the internal shoulder 16 on the tubular body 12. An advantage of the sprinkler head embodiment 61 is that both the piston 62 and the latching assembly 72 can be constructed of inexpensive stamped parts.

Obviously, many modifications and variations of the present invention are possible in light of the above teachings. It is to be understood, therefore, that the invention can be practiced otherwise than as specifically described.

What is claimed is:

1. Fire sprinkler apparatus comprising:
a tubular body means defining an inlet adapted for connection to a supply of pressurized fire extinguishing fluid and an outlet adapted for placement in a fire protected zone;
a valve means retained by and mounted for reciprocal movement within said body means and receiving a primary force produced by the pressurized fluid at said inlet, said valve means being movable by said force from a closed position to an open position and providing in said closed position a fluid tight seal between said inlet and said outlet and allowing in said open position fluid flow therebetween;
locking means retained by and movable with said valve means and reciprocably movable between an engaged position and a disengaged position, said locking means being shaped and arranged in said engaged position to transfer between said valve means and said body means a substantial first component of said primary force and to thereby prevent relative movement therebetween, and shaped and arranged in said disengaged position to substantially eliminate said first component of force between said valve means and said body means and to allow relative movement therebetween; and
latching means automatically movable from a latched position to a released position in response to a predetermined condition, said latching means being shaped and arranged in said latched position to retain said locking means in said engaged position and to receive therefrom only a substantially reduced component of said primary force, and shaped and arranged in said released position to permit movement of said locking means into said disengaged position.

2. An apparatus according to claim 1 including deflector means supported for movement with said piston and adapted to deflect fluid discharged from said outlet with said piston in said open position, and wherein said locking means is disposed between said inlet and said deflector means.

3. An apparatus according to claim 1 wherein said deflector means comprises an outer periphery that is outwardly displaced from said locking means in directions transverse to the direction of movement of said valve means.

4. An apparatus according to claim 1 wherein said latching means comprises a fusible means and said predetermined condition is the melting temperature of said fusible means.

5. An apparatus according to claim 4 wherein said latching means further comprises a retainer means held by said fusible means in contact with said locking means so as to prevent movement thereof into said disengaged position and released to allow said movement by melting of said fusible means.

6. An apparatus according to claim 5 wherein said reduced component of said primary force is less than said first component thereof.

7. An apparatus according to claim 1 wherein said valve means comprises a piston mounted for reciprocating movement between said closed and open positions along an axis in said tubular body means, said primary force is directed along said axis, and each of said first and reduced components of said primary force include force components directed transverse to said axis.

8. An apparatus according to claim 7 wherein said movement of said locking means between said engaged and disengaged positions is in a direction transverse to said axis.

9. An apparatus according to claim 8 wherein said locking means comprises a plurality of spaced apart locking members, each engaged by said latching means and retained thereby in a said engaged position; and said tubular body means comprises an inner wall that defines recess means for receiving each of said locking members in said engaged positions.

10. An apparatus according to claim 9 wherein said locking members comprise a plurality of locking balls retained by openings in a side wall portion of said piston and said recess means comprises an annular groove in said inner wall.

11. An apparatus according to claim 10 wherein said latching means comprises a fusible means and said predetermined condition is the melting temperature of said fusible means.

12. An apparatus according to claim 11 wherein said latching means further comprises a retainer means held by said fusible means in contact with said locking means so as to prevent movement thereof into said disengaged position and released to allow said movement by melting of said fusible means.

13. An apparatus according to claim 12 wherein in response to melting of said fusible means said retainer means moves in the direction of said axis to allow movement of said locking balls into said disengaged positions out of said annular groove.

14. An apparatus according to claim 13 wherein said retainer means comprises an adjustment element adjustably retained between said piston and said fusible means and adjustable to establish a desired contact force between said retainer means and said locking balls.

15. An apparatus according to claim 14 wherein said piston comprises a cylindrical shell defining said openings and a central cavity, and said retainer means comprises a stamped retainer element engaged between said locking balls and said fusible means.

16. An apparatus according to claim 14 wherein said piston defines a central cavity communicating with said openings, and said retainer means comprises a retainer ball disposed within said cavity.

17. An apparatus according to claim 16 wherein said retainer means further comprises a retainer pin engaged between said retainer ball and said fusible means and adapted to move in the direction of said axis in response to melting of said fusible means.

18. Fire sprinkler apparatus comprising:
a tubular body means defining an inlet adapted for connection to a source of pressurized fluid, an outlet adapted for placement in a fire protected zone, and an internal recess means;
a valve piston mounted for axial movement within said body means between closed and open positions, said piston providing in said closed position a fluid tight seal between said inlet and outlet and allowing in said open position fluid flow therebetween;
a locking means retained by said piston and laterally movable therein between an engaged position within said recess means so as to prevent relative movement between said body means and said piston and a disengaged position out of said recess means so as to allow said relative movement therebetween; and latching means automatically movable in response to a predetermined condition from a latched position that retains said locking means in said engaged position and a released position that permits movement thereof into said disengaged position.

19. An apparatus according to claim 18 wherein said deflector means comprises an outer periphery that is outwardly displaced from said locking means in directions transverse to the direction of movement of said valve means.

20. An apparatus according to claim 18 including deflector means supported for movement with said piston and adapted to deflect fluid discharged from said outlet with said piston in said open position, and wherein said locking means is disposed between said inlet and said deflector means.

21. An apparatus according to claim 20 wherein said retainer means further comprises a retainer pin engaged between said retainer ball and said fusible means and adapted to move in the direction of said axis in response to melting thereof.

22. An apparatus according to claim 20 wherein said piston comprises a cylindrical shell defining said openings and a central cavity, and said retainer means comprises a stamped retainer element engaged between said locking balls and said fusible means.

23. An apparatus according to claim 20 wherein said fusible means comprises a spherical body composed of a eutectic alloy.

24. An apparatus according to claim 20 wherein said locking means comprise a plurality of spaced apart locking balls retained by openings in a side wall portion of said piston and said recess means comprises an annular groove in said inner wall.

25. An apparatus according to claim 24 wherein said latching means comprises a fusible means and said predetermined condition is the melting temperature of said fusible means.

26. An apparatus according to claim 25 wherein said latching means further comprises a retainer means held by said fusible means in contact with said locking means so as to prevent movement thereof into said disengaged position and released to allow said movement by melting of said fusible means.

27. An apparatus according to claim 26 wherein in response to melting of said fusible means said retainer means moves in the direction of said axis to allow movement of said locking balls into said disengaged positions out of said annular groove.

28. An apparatus according to claim 27 wherein said retainer means comprises an adjustment element adjustably retained between said piston and said fusible means and adjustable to establish a desired contact force between said retainer means and said locking balls.

29. An apparatus according to claim 28 wherein said piston defines a central cavity communicating with said openings, and said retainer means comprises a retainer ball disposed within said cavity.

* * * * *